United States Patent
Lim et al.

(10) Patent No.: US 11,088,879 B2
(45) Date of Patent: Aug. 10, 2021

(54) METHOD FOR TRANSMITTING OR RECEIVING FRAME IN WIRELESS LAN SYSTEM AND APPARATUS THEREFOR

(71) Applicant: LG Electronics Inc., Seoul (KR)

(72) Inventors: Dongguk Lim, Seoul (KR); Eunsung Park, Seoul (KR); Jinsoo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/609,169

(22) PCT Filed: Apr. 18, 2018

(86) PCT No.: PCT/KR2018/004505
§ 371 (c)(1),
(2) Date: Oct. 28, 2019

(87) PCT Pub. No.: WO2018/199544
PCT Pub. Date: Nov. 1, 2018

(65) Prior Publication Data
US 2020/0099556 A1    Mar. 26, 2020

Related U.S. Application Data

(60) Provisional application No. 62/490,035, filed on Apr. 26, 2017.

(51) Int. Cl.
*H04L 27/20* (2006.01)
*H04L 5/00* (2006.01)
(Continued)

(52) U.S. Cl.
CPC ............ *H04L 27/20* (2013.01); *H04L 5/0053* (2013.01); *H04L 27/2613* (2013.01);
(Continued)

(58) Field of Classification Search
None
See application file for complete search history.

(56) References Cited

U.S. PATENT DOCUMENTS

2007/0094600 A1    4/2007  Sullivan et al.
2013/0128807 A1*   5/2013  Vermani ............ H04L 27/2602
                                             370/328
(Continued)

FOREIGN PATENT DOCUMENTS

WO    WO2017026769    2/2017

OTHER PUBLICATIONS

Son et al., "WUR Signaling Field," IEEE 802.11-17/0049r0, dated Jan. 16, 2017, 9 pages.
(Continued)

*Primary Examiner* — James P Duffy
(74) *Attorney, Agent, or Firm* — Fish & Richardson P.C.

(57) ABSTRACT

A method for transmitting a physical layer protocol data unit (PPDU) by a station (STA) in a wireless LAN (WLAN) system according to an embodiment of the present invention may comprise the steps of: configuring an L-part including a legacy-short training field (L-STF), a legacy-long training field (L-LTF), and a legacy-signal field (L-SIG); when a PPDU to be transmitted by the STA corresponds to a predetermined format, performing binary phase shift keying (BPSK) modulation on N consecutive symbols located after the L-SIG, for packet classification; and transmitting the PPDU including the L-part and the N BPSK-modulated symbols.

8 Claims, 23 Drawing Sheets

(51) Int. Cl.
  *H04L 27/26* (2006.01)
  *H04W 52/02* (2009.01)
  *H04W 84/12* (2009.01)
  *H04W 88/08* (2009.01)

(52) U.S. Cl.
  CPC ....... *H04W 52/0216* (2013.01); *H04W 84/12* (2013.01); *H04W 88/08* (2013.01)

(56) References Cited

U.S. PATENT DOCUMENTS

2016/0080973 A1    3/2016   Tian et al.
2017/0094600 A1    3/2017   Min et al.
2018/0263058 A1*   9/2018   Yang ................ H04W 74/0825

OTHER PUBLICATIONS

Kim et al., "WUR MAC issues follow-up," IEEE 802.11-17/0381r0, dated Mar. 11, 2017, 20 pages.
Urn et al., "WUR Frame Structure follow-up," IEEE 802.11-17/352r1, dated Mar. 12, 2017, 15 pages.
EP Supplementary Search Report in European Application No. EP 18790385, dated Feb. 19, 2020, 8 pages.
Wei et al., "Packet Design for Wake-Up Receiver (WUR)", ZTE Corp., IEEE 802.11-17/0066r0, Jan. 2017, 9 pages.

* cited by examiner (a)

| L-PART | | | WUR-part | | |
|---|---|---|---|---|---|
| L-STF | L-LTF | L-SIG | WUR-preamble | WUR-SIG | WUR-Body |

(a)

(b)

METHOD FOR TRANSMITTING OR RECEIVING FRAME IN WIRELESS LAN SYSTEM AND APPARATUS THEREFOR

CROSS-REFERENCE TO RELATED APPLICATIONS

This application is a National Stage application under 35 U.S.C. § 371 of International Application No. PCT/KR2018/004505, filed on Apr. 18, 2018, which claims the benefit of U.S. Provisional Application No. 62/490,035 filed on Apr. 26, 2017. The disclosures of the prior applications are incorporated by reference in their entirety.

BACKGROUND

Field

The present specification relates to a wireless local area network (WLAN) system and, more particular, to a method for transmitting or receiving a new-format PPDU including an L-part for a legacy STA and an apparatus therefor.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. Discussions are now being made on the IEEE 802.11 ax standardization.

SUMMARY

An aspect of the present specification is to provide a method for accurately and efficiently transmitting or receiving a physical layer protocol data unit (PPDU) in a new format and an apparatus therefor.

The present specification is not limited to the foregoing aspect, and other aspects may be inferred from embodiments of the present specification.

To achieve the foregoing aspect, a method for transmitting, by a station (STA), a PPDU in a wireless local area network (WLAN) system according to an embodiment of the present specification may include: configuring an L-part comprising a legacy-short training field (L-STF), a legacy-long training field (L-LTF), and a legacy-signal field (L-SIG); performing binary phase shift keying (BPSK) modulation on N consecutive symbols located after the L-SIG for packet classification when a PPDU to be transmitted by the STA is a predetermined format; and transmitting the PPDU comprising the L-part and the N BPSK-modulated symbols.

To achieve the foregoing aspect, a STA for transmitting a PPDU in a WLAN system may include: a processor to configure an L-part comprising a legacy-short training field (L-STF), a legacy-long training field (L-LTF), and a legacy-signal field (L-SIG), and to perform binary phase shift keying (BPSK) modulation on N consecutive symbols located after the L-SIG for packet classification when a PPDU to be transmitted by the STA is a predetermined format; and a transmitter to transmit the PPDU comprising the L-part and the N BPSK-modulated symbols according to control of the processor.

The PPDU in the predetermined format may correspond to a wake-up radio (WUR) PPDU. The WUR PPDU may further include a WUR preamble for synchronization, the L-SIG and the N symbols for packet classification included in the WUR PPDU are transmitted through the entire primary connectivity radio (PCR) band. The WUR preamble may be transmitted through some tones of the PCR band.

The N symbols for packet classification may correspond to dummy symbols or may be a repetition of the L-SIG.

The STA may skip scrambling of the N symbols for packet classification.

N may be 2 or 3.

The STA may be an access point (AP) STA or a non-AP STA.

According to an embodiment of the present specification, a plurality of BPSK-modulated symbols following an L-SIG field may be configured, thereby preventing a PPDU from being incorrectly determined as an 11a/n/ac/ax PPDU.

In addition to the foregoing technical effect, other technical effects may be inferred from embodiments of the present specification.

BRIEF DESCRIPTION OF THE DRAWINGS

FIG. 19 illustrates an example of the frame structure of a WUR PPDU.

DESCRIPTION OF EXEMPLARY EMBODIMENTS

Hereinafter, the preferred embodiment of the present specification will be described in detail with reference to the appended drawings. The detailed description that will hereinafter be disclosed along with the appended drawings will only be provided to describe an exemplary embodiment of the present specification. Therefore, it should be understood that the exemplary embodiment presented herein will not represent the only embodiment for carrying out the present specification.

The following detailed description includes specific details for providing a full understanding of the present specification. However, it will be apparent to anyone skilled in the art that the present specification can be carried out without referring to the above-mentioned specific details. In some cases, in order to avoid any ambiguity in the concept of the present specification, the disclosed structure and device may be omitted, or the disclosed structure and device may be illustrated as a block diagram based on their core functions.

As described above, the following description relates to a method for efficiently utilizing a channel with a wide band in a wireless LAN (WLAN) system, and a device for the method. To this end, the WLAN system to which the present specification is applied will be described in detail.

Figure 1:
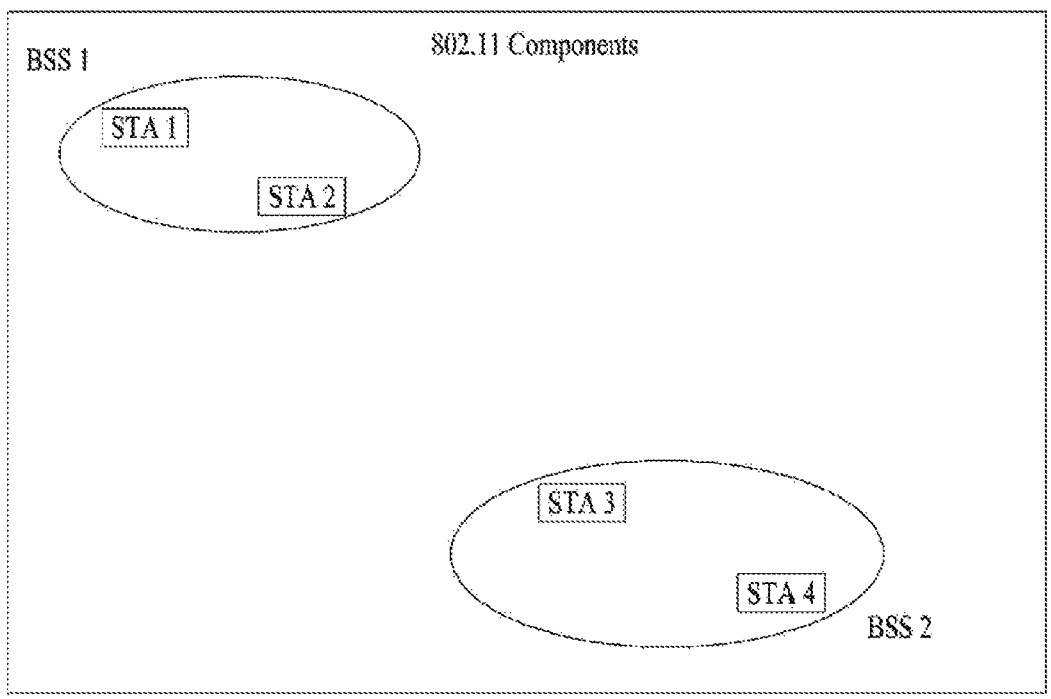
FIG. 1 illustrates an exemplary configuration of a wireless LAN (WLAN) system.

FIG. 1 illustrates an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. Therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. Since the BSS does not include an AP, access to the DS is not authorized (or approved), and, therefore, the IBSS functions as a self-contained network.

Figure 2:
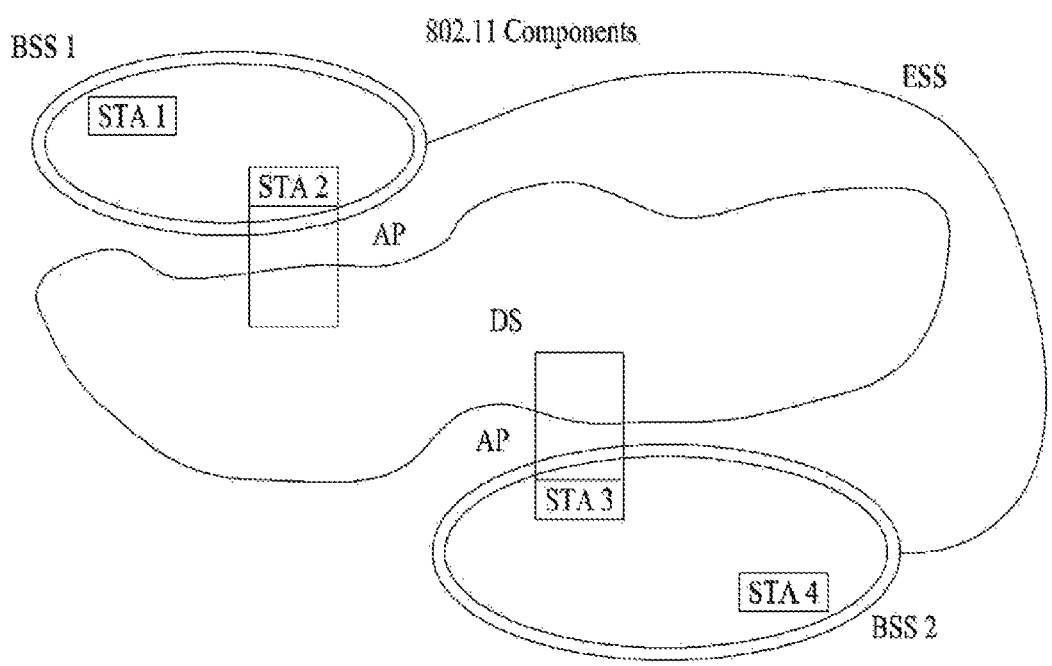
FIG. 2 illustrates another exemplary configuration of a wireless LAN (WLAN) system.

FIG. 2 illustrates another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Layer Structure

An operation of an STA operating in a WLAN system may be described in terms of a layer structure. The layer structure may be implemented by a processor in terms of a device configuration. The STA may have a multi-layer structure. For example, a layer structure in the 802.11 standard document is a MAC sublayer and a physical (PHY) layer on a data link layer (DLL). The PHY layer may include a physical layer convergence procedure (PLCP) entity, a physical medium dependent (PMD) entity, or the like. The MAC sublayer and the PHY layer include management entities referred to as a MAC sublayer management entity (MLME) and a physical layer management entity (PLME), respectively. Those entities provide a layer management service interface in which a layer management function operates.

In order to provide an accurate MAC operation, a station management entity (SME) exists in each STA. The SME is a layer-independent entity which may be present in a separate management plane or which may be seen to be off to the side. Although accurate functions of the SME are not described in detail in the present document, in general, it may be seen that the functions are for collecting a layer-dependent state from various layer management entities (LMEs), for setting layer-specific parameters to have similar values, or the like. In general, the SME may perform those functions on behalf of a general system management entity, and may implement a standard management protocol.

The aforementioned entities interact in various manners. For example, the interaction between the entities may be achieved by exchanging GET/SET primitives. The primitive implies a set of parameters or elements related to a specific purpose. An XX-GET.request primitive is used to request for a value of a given MIB attribute (attribute information based on management information). An XX-GET.confirm primitive is used to return a proper MIB attribute information value if a status is "success", and otherwise to return an error indication in a status field. An XX-SET.request primitive is used such that an indicated MIB attribute is set to a given value. When the MIB attribute implies a specific operation, it is a request for performing the operation. In addition, an XX-SET.confirm primitive is used to confirm that an indicated MIB attribute is set to a requested value if a status is "success", and otherwise to return an error condition in a status field. When the MIB attribute implies a specific operation, it is confirmed that the operation has been performed.

In addition, the MLME and the SME may exchange various MLME_GET/SET primitives through an MLME SAP (Service Access Point). In addition, the various PLME_GET/SET primitives may be exchanged between the PLME and the SME through the PLME_SAP, and may be exchanged between the MLME and the PLME through the MLME-PLME_SAP.

Link Setup Process

Figure 3:
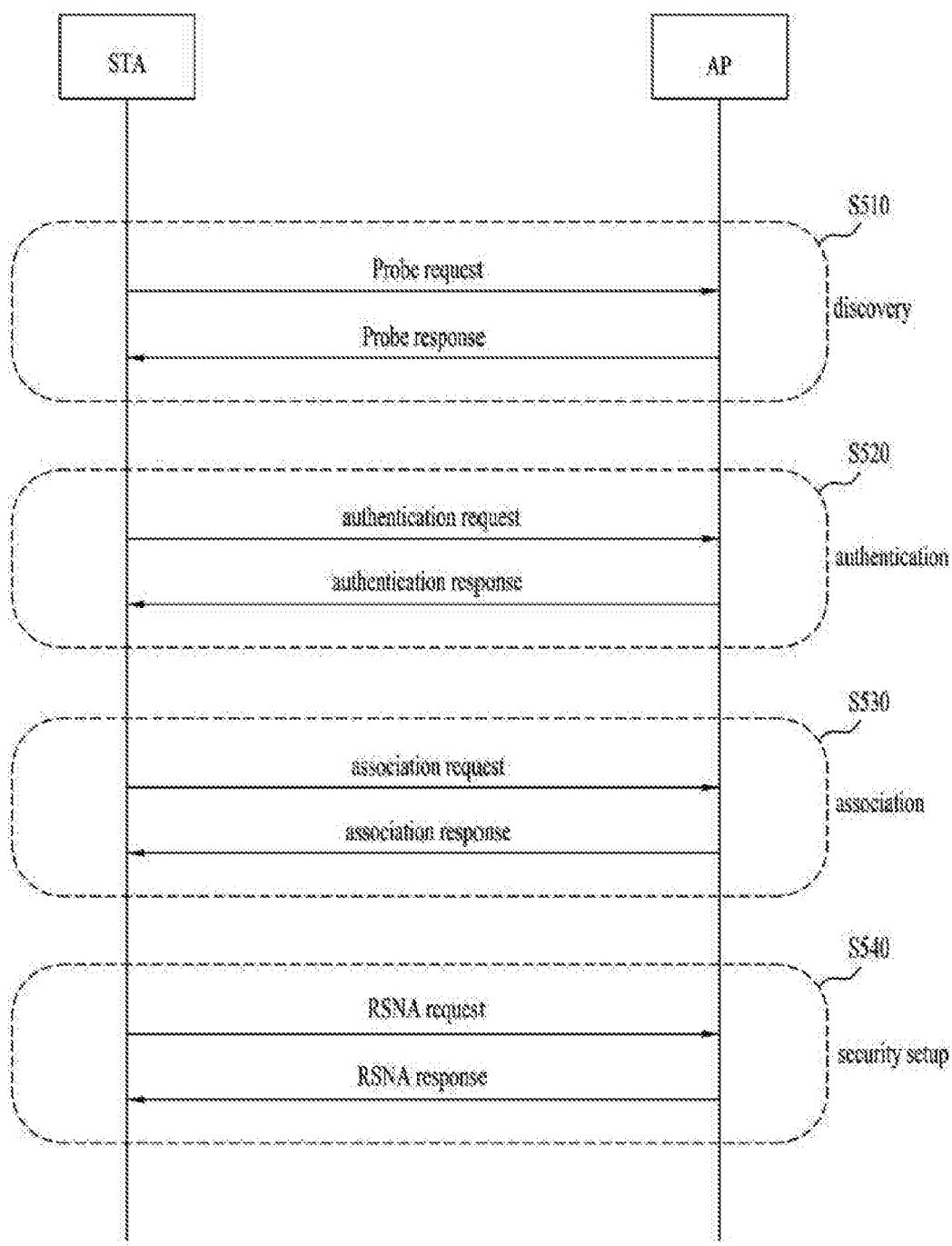
FIG. 3 illustrates a typical link setup process.

FIG. 3 illustrates a typical link setup process.

In order for an STA to set up a link for a network, the STA shall first discover the network, perform authentication, establish an association, and be subjected to an authentication procedure or the like for security. The link setup process may be referred to as a session initiation process or a session setup process. In addition, the process of discovery, authentication, association, and security configuration of the link setup process may be collectively referred to as an association process.

Referring to FIG. 3, an exemplary link setup process will be described.

In step S510, an STA may perform a network discovery operation. The network discovery operation may include a scanning operation of the STA. That is, a joinable network shall be found in order for the STA to have access to the network. The STA shall identify a compatible network before joining a wireless network, and a process of identifying a network existing in a specific region is called scanning.

The scanning includes active scanning and passive scanning.

The network discovery operation including the active scanning process is shown as an example in FIG. 3. In the active scanning, an STA performing the scanning transmits a probe request frame to discover a nearby AP while moving between channels, and waits for a response thereto. In response to the probe request frame, a responder transmits a probe response frame to the STA which has transmitted the probe request frame. Herein, the responder may be an STA which has lastly transmitted a beacon frame in a BSS of a channel being scanned. In the BSS, an AP is the responder since the AP transmits the beacon frame. In an IBSS, the responder is not constant since STAs in the IBSS transmit the beacon frame in turn. For example, an STA which has transmitted a probe request frame in a channel #1 and has received a probe response frame in the channel #1 may store BSS-related information included in the received probe response frame and move to a next channel (e.g., a channel #2) to perform scanning (i.e., probe request/response transmission and reception on the channel #2) in the same manner.

Although not shown in FIG. 3, the scanning operation may be performed in a passive scanning manner. In the passive scanning, an STA performing the scanning waits for a beam frame while moving between channels. The beacon frame is one of management frames in IEEE 802.11, and is transmitted periodically to report the existence of a wireless network and to allow the STA performing scanning to find the wireless network so as to join the wireless network. In the BSS, an AP serves to periodically transmit the beacon frame. In the IBSS, STAs in the IBSS transmit the beacon frame in turn. The STA performing scanning stores the BSS-related information included in the beacon frame while receiving the beacon frame, and records beacon frame information in each channel while moving to another channel. An STA which has received the beacon frame may store the BSS-related information included in the received beacon frame, and may move to a next channel to perform scanning in the next channel in the same manner.

Comparing the active scanning and the passive scanning, advantageously, the active scanning has less delay and power consumption than the passive scanning.

After the STA discovers the network, an authentication process may be performed in step S520. The authentication process may be referred to as a first authentication process in order to clearly distinguish from a security setup operation of step S540 described below.

The authentication process includes a process in which the STA transmits an authentication request frame to the AP, and the AP transmits an authentication response frame to the STA in response thereto. The authentication frame used in the authentication request/response corresponds to a management frame.

The authentication frame may include information on an authentication algorithm number, an authentication transaction sequence number, a status code, a challenge text, a robust security network (RSN), a finite cyclic group, or the like. This information corresponds to some examples of information which may be included in the authentication request/response frame, and may be replaced with different information, or additional information may be further included.

The STA may transmit the authentication request frame to the AP. The AP may determine whether to accept authentication for a corresponding STA based on information included in the received authentication request frame. The AP may provide an authentication processing result to the STA through the authentication response frame.

After the STA is successfully authenticated, an association process may be performed in step S530. The association process includes a process in which the STA transmits an association request frame to the AP, and the AP transmits an association response frame to the STA in response thereto.

For example, the association request frame may include information related to various capabilities, a beacon listen interval, a service set identifier (SSID), supported rates, supported channels, RSN, a mobility domain, supported operating classes, a traffic indication map (TIM) broadcast request, an interworking service capability, or the like.

For example, the association response frame may include information related to various capabilities, a status code, an association ID (AID), supported rates, an enhanced distributed channel access (EDCA) parameter set, a received channel power indicator (RCPI), a received signal to noise indicator (RSNI), a mobility domain, a timeout interval (association comeback time), an overlapping BBS scan parameter, a TIM broadcast request, a QoS map, or the like.

This information corresponds to some examples of information which may be included in the association request/response frame, and may be replaced with different information, or additional information may be further included.

After the STA is successfully associated with the network, a security setup process may be performed in step S540. The security setup process of step S540 may be referred to as an authentication process through a robust security network association (RSNA) request/response. The authentication process of step S520 may be referred to as a first authentication process. The security setup process of step S540 may be simply referred to as an authentication process.

The security setup process of step S540 may include a private key setup process through 4-way handshaking by using, for example, an extensible authentication protocol over LAN (EAPOL) frame. In addition, the security setup process may be performed according to a security scheme not defined in the IEEE 802.11 standard.

Medium Access Mechanism

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. According to this type of access mechanism, an AP and/or an STA may perform clear channel assessment (CCA) which senses a medium or a wireless channel during a specific time duration (e.g., DCF inter-frame space (DIFS)) before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration (e.g., a random backoff period) for medium access. By applying the random backoff period, it is expected that several STAs attempt to transmit a frame after waiting for different time durations, thereby minimizing a collision.

In addition, the IEEE 802.11 MAC protocol provides a hybrid coordination function (HCF). The HCF is based on the DCF and a point coordination function (PCF). The PCF is a polling-based synchronous access scheme in which polling is periodically performed so that all receiving APs and/or STAs can receive data frames. In addition, the HCF may have enhanced distributed channel access (EDCA) and HCF controlled channel access (HCCA). The EDCA is a contention based access scheme for providing a data frame to a plurality of users, and the HCCA is a contention-free based channel access scheme using a polling mechanism. In addition, the HCF may include a medium access mechanism for improving a quality of service (QoS) of the WLAN, and may transmit QoS data in both a contention period (CP) and a contention-free period (CFP).

Figure 4:
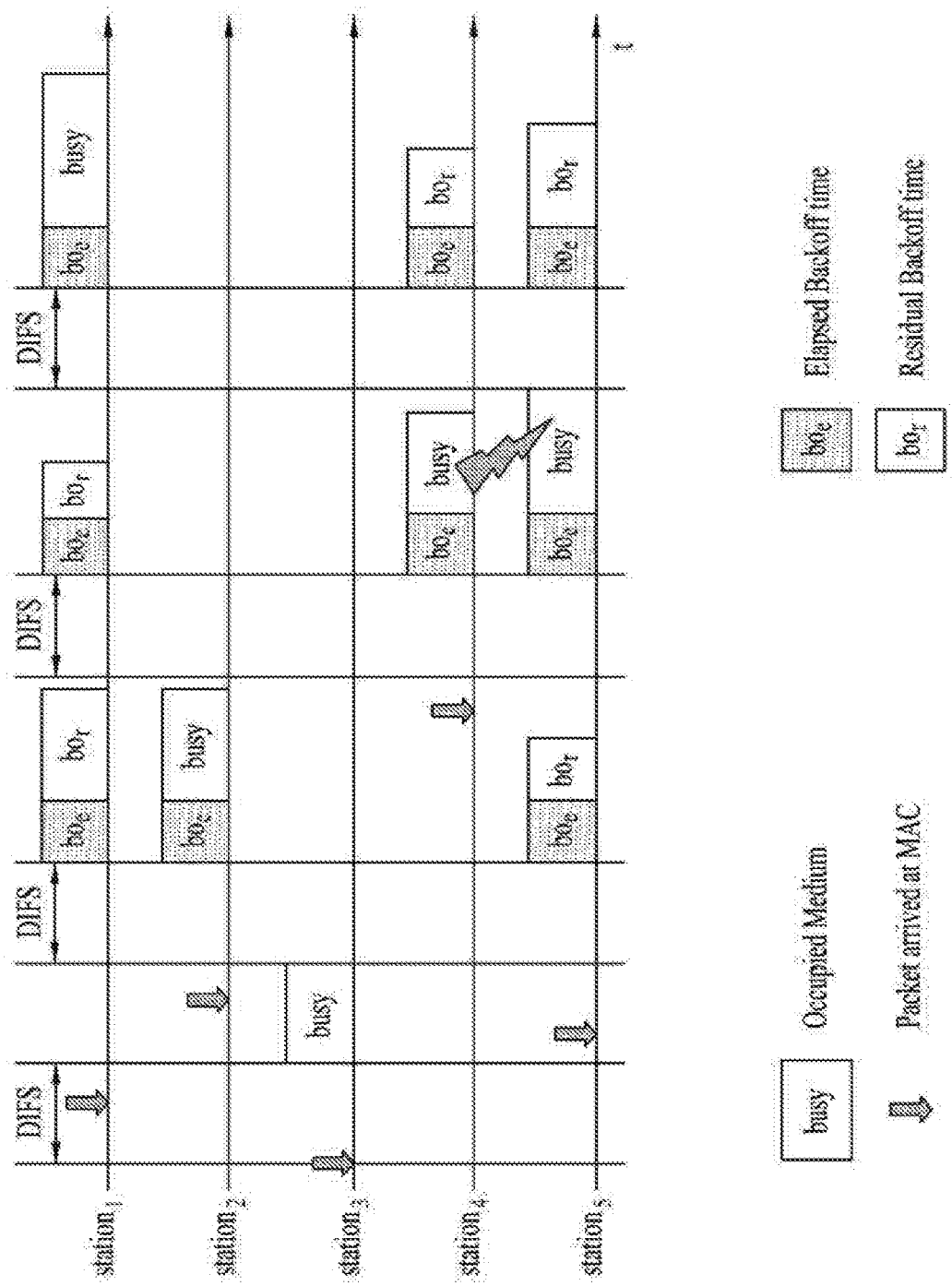
FIG. 4 illustrates a backoff process.

FIG. 4 illustrates a backoff process.

An operation based on a random backoff period will be described with reference to FIG. 4. When a specific medium is changed from an occupied (or busy) status to an idle status, several STAs may attempt data (or frame) transmission. In this case, as a method for minimizing a collision, each of the STAs may select a random backoff count and may attempt transmission after waiting for a corresponding time slot. The random backoff count may have a packer number value, and may be determined as one of values in the range of 0 to CW. Herein, the CW is a contention window parameter value. The CW parameter has an initial value given as CWmin, but may take a value two times higher than that if transmission fails (e.g., if ACK is not received for a transmitted frame). If the CW parameter value is CWmax, data transmission may be attempted while maintaining CWmax until data transmission is successful, and if data transmission is successful, the value is reset to CWmin. The values CW, CWmin, and CWmax are preferably set to $2^n-1$ (n=0, 1, 2, . . . ).

When the random backoff process starts, the STA continuously monitors a medium during counting down a backoff slot according to the determined backoff count value. When the medium is monitored in the busy status, the STA stops the countdown and waits. When the medium is monitored in the idle status, the STA resumes the countdown.

Figure 6:
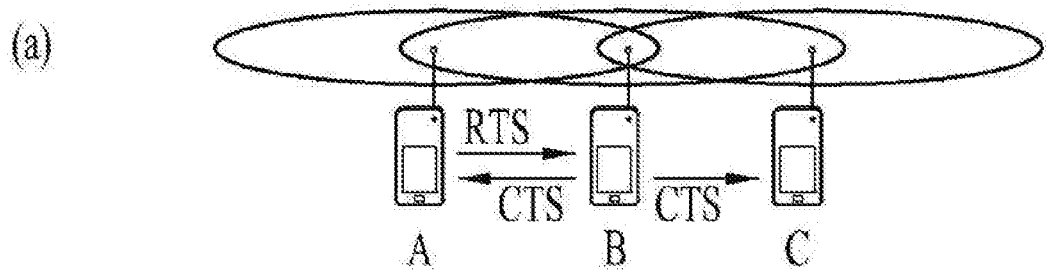
FIG. 6 illustrates RTS and CTS.
Figure 6:
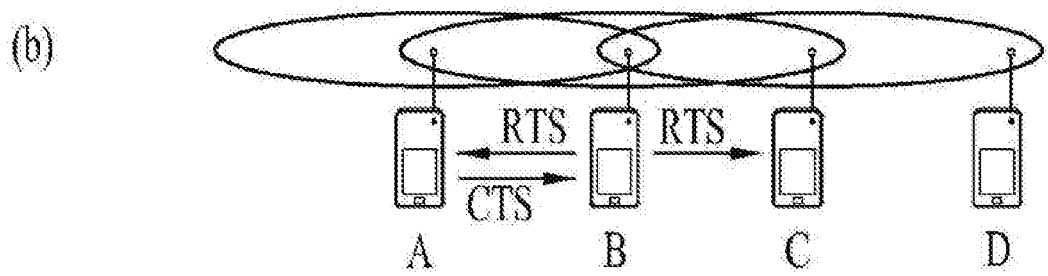

In the example of FIG. 4, upon arrival of a packet to be transmitted to MAC of an STA 3, the STA3 may transmit a frame immediately after identifying that the medium is idle for a time of DIFS. Meanwhile, the remaining STAs may monitor that the medium is in the busy status and may wait. In the meantime, data to be transmitted may be generated in each of STAs 1, 2, and 5. Each STA may wait for the DIFS when the medium is monitored in the idle status, and thereafter may count down a backoff slot according to a random backoff time selected by each STA. The example of FIG. 4 shows a case where the STA2 selects a shortest backoff time, and the STA1 selects a longest backoff count value. That is, it is shown that a residual backoff time of the STA5 is shorter than a residual backoff time of the STA1 at a time when the STA2 finishes backoff counting for the selected random backoff time and starts frame transmission. The STA1 and the STA5 stop the countdown and waits during the STA2 occupies a medium. When the medium occupancy of the STA2 is finished and thus the medium is in the idle status again, the STA1 and the STA5 resume the countdown for the residual backoff time which has stopped after waiting for the DIFS. That is, frame transmission may start after counting down the residual backoff slot corresponding to the residual backoff time. Since the STA5 has a shorter residual backoff time than the STA1, the STA5 starts frame transmission. Meanwhile, data to be transmitted may be generated also in the STA4 during the STA2 occupies the medium. In this case, the STA4 may wait for the DIFS when the medium is in the idle status, and thereafter may perform the countdown based on the random backoff count value selected by the STA4 and may start frame transmission. The example of FIG. 6 shows a case where the residual backoff time of the STA5 incidentally coincides with the random backoff time of the STA4. In this case, a collision may occur between the STA4 and the STA5. When the collision occurs, both the STA4 and the STA5 cannot receive ACK, which leads to a failure in data transmission. In this case, the STA4 and the STA5 may double a CW value and then select the random backoff count value, and may perform the countdown. Meanwhile, the STA1 may wait during a medium is in the busy state due to transmission of the STA4 and the STA5, and when the medium is in the idle status, may wait for DIFS and thereafter may transmit a frame at the expiry of the residual backoff time.

Sensing Operation of STA

As described above, a CSMA/CA mechanism includes virtual carrier sensing as well as physical carrier sensing in which an AP and/or an STA directly senses a medium. The virtual carrier sensing is intended to compensate for a problem which may occur on medium access such as a hidden node problem or the like. For the virtual carrier sensing, MAC of a WLAN system may use a network allocation vector (NAV). The NAV is a value used by an AP and/or STA, which is currently using a medium or has a right to use it, to indicate a remaining time until the medium is in an available state to another AP and/or STA. Therefore, the value which is set to the NAV corresponds to an interval scheduled to use the medium by an AP and/or STA for transmitting a corresponding frame, and an STA receiving the NAV value is prohibited from accessing the medium during the interval. The NAV may be set, for example, according to a value of a "duration" field of an MAC header of the frame.

In addition, a robust collision detection mechanism has been introduced to reduce the possibility of collision. This will be described with reference to FIG. 5 and FIG. 7. Although a carrier sensing range may not be actually identical to a transmission range, it is assumed that they are identical to each other for convenience of explanation.

Figure 5:
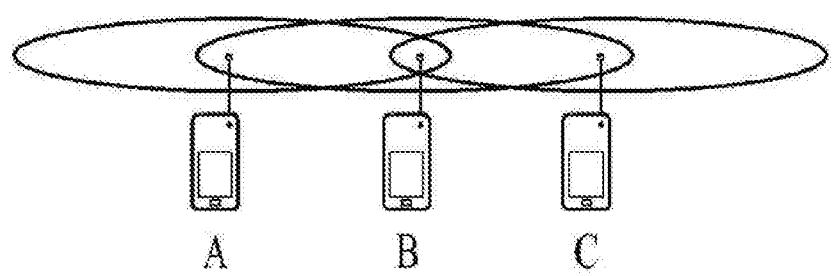
FIG. 5 illustrates a hidden node and an exposed node.
Figure 5:
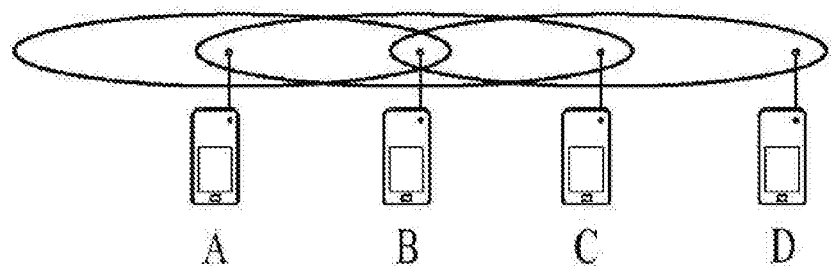

FIG. 5 illustrates a hidden node and an exposed node.

FIG. 5(a) is an example of a hidden node when an STA A communicates with an STA B, and an STA C has information to be transmitted. Specifically, although it is a situation where the STA A transmits information to the STA B, it may be determined that a medium is in an idle status when the STA C performs carrier sensing before transmitting data to the STA B. This is because transmission (e.g., medium occupancy) of the STA A may not be sensed at a location of the STA C. In this case, the STA B simultaneously receives information of the STA A and the STA C, which results in a collision. In this case, the STA A may be referred to as a hidden node of the STA C.

FIG. 5(b) is an example of an exposed node when an STA C has information to be transmitted from an STA D in a situation where and an STA B transmits data to an STA A. In this case, when the STA C performs carrier sensing, it may be determined as a state where a medium is occupied due to transmission of the STA B. Accordingly, even if the STA C has information to be transmitted to the STA D, since an occupied status of the medium is sensed, waiting is required until the medium becomes an idle status. However, since the STA A is actually out of a transmission range of the STA C, transmission from the STA C and transmission from the STA B may not collide with each other from a perspective of the STA A. Therefore, the STA C unnecessarily waits until the STA B stops transmission. In this case, the STA C may be referred to as an exposed node of the STA B.

FIG. 6 illustrates RTS and CTS.

In order to efficiently utilize a collision avoidance mechanism in an exemplary situation of FIG. 5, a short signaling packet such as request to send (RTS) and clear to send (CTS) or the like may be utilized. The RTS/CTS between two STAs may allow overhearing of nearby STA(s), thereby allowing the nearby STA(s) to consider whether to transmit information between the two STAs. For example, when an STA intending to transmit data transmits an RTS frame to an STA for receiving data, the STA for receiving data may transmit the CTS frame to the nearby STAs to report that the STA will receive data.

FIG. 6(a) is an example of a method for solving a hidden node problem when both an STA A and an STA C intend to transmit data to an STA B. When the STA A sends RTS to the STA B, the STA B transmits CTS to both the STA A and STA C located around the STA B. As a result, the STA C waits until the STA A and the STA B stop data transmission, thereby avoiding a collision.

FIG. 6(b) is an example of a method of solving an exposed hidden problem. Since an STA C overhears RTS/CTS transmission between an STA A and an STA B, the STA C may determine that a collision will not occur even if the STA C transmits data to another STA (e.g., an STA D). That is, the STA B transmits RTS to all nearby STAs, and only the STA A having data to be actually transmitted transmits CTS. The STA C receives only the RTS and does not receive the CTS of the STA A, and thus can know that the STA A is located out of a carrier sensing range of the STA C.

Power Management

In the aforementioned WLAN system, an STA has to perform channel sensing before performing transmission/reception, which causes persistent power consumption of the STA. Power consumption in a reception state is not significantly different from power consumption in a transmission state, and maintaining the reception state persistently is a great burden to an STA with limited power (i.e., operating by a battery). Therefore, if the STA maintains a reception waiting state to persistently sense a channel, power may be inefficiently consumed without a special benefit in terms of a WLAN throughput. In order to solve such a problem, the WLAN system supports a power management (PM) mode of the STA.

The PM mode of the STA is divided into an active mode and a power save (PS) mode. The STA operates in the active mode by default. The STA operating in the active mode maintains an awake state. The awake state is a state where a normal operation such as frame transmission/reception, channel scanning, or the like is possible. Meanwhile, an STA operating in the PS mode operates while switching a sleep state (or doze state) and the awake state. The STA operating in the sleep state operates with minimum power, and does not perform channel scanning not to mention frame transmission/reception.

Power consumption decreases when the STA operates in the sleep state as long as possible, and thus an operating duration of the STA increases. However, since frame transmission/reception is impossible in the sleep state, it is not possible to operate unconditionally for long. In the presence of a frame to be transmitted to the AP by the STA operating in the sleep state, a frame may be transmitted by switching to the awake state. Meanwhile, in the presence of a frame to be transmitted to the STA by the AP, the STA in the sleep state cannot receive this and cannot know the presence of the frame to be received, either. Therefore, the STA may require an operation of switching to the awake state according to a specific period in order to know whether there is a frame to be transmitted to the STA (or in order to receive the frame in the presence of the frame).

The AP may transmit a beacon frame to the STAs in a BSS with a specific period. A traffic indication map (TIM) information element may be included in the beacon frame. The TIM information element may include information indicating that the AP has buffered traffic for STAs associated with the AP and will transmit the frame. An example of the TIM element includes a TIM used to report a unicast frame and a delivery traffic indication map (DTIM) used to report a multicast or broadcast frame.

Figure 7:
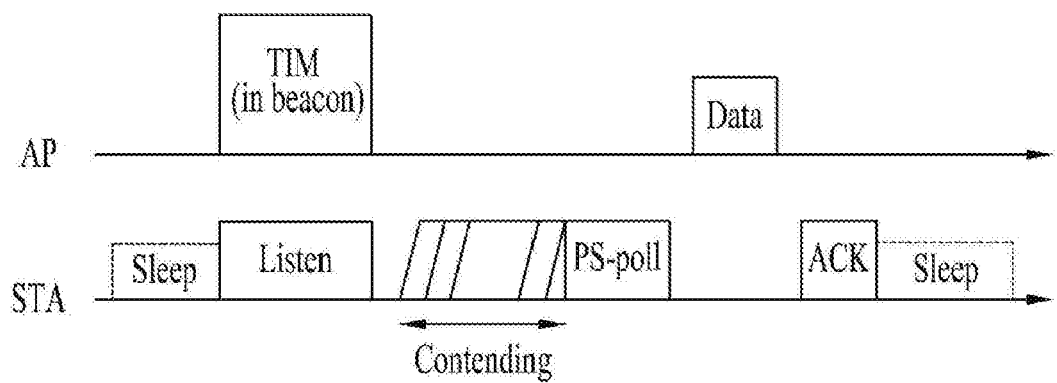
FIG. 7 to FIG. 9 are drawings for explaining in detail an operation of an STA which has received a TIM.
Figure 8:
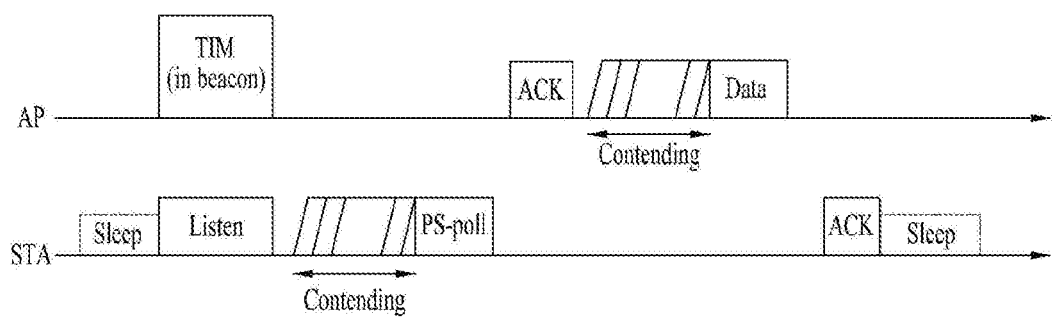
Figure 9:
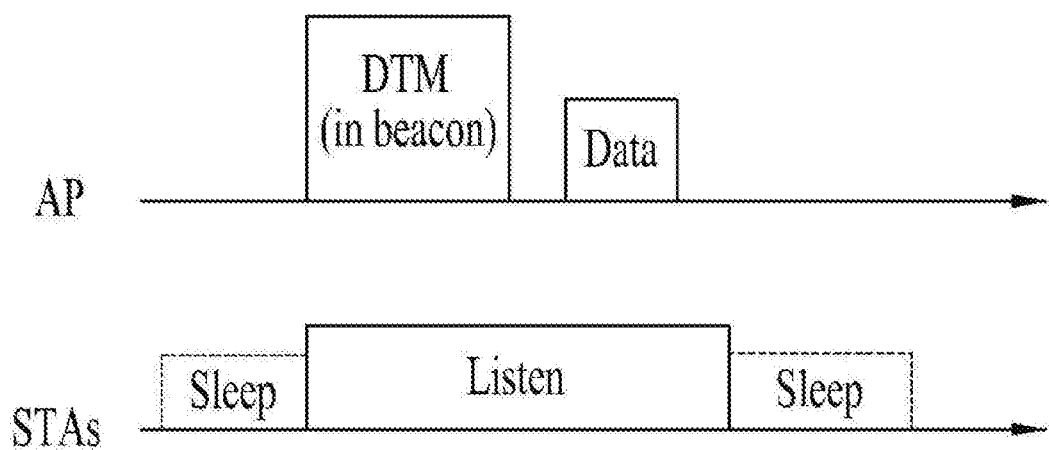

FIG. 7 to FIG. 9 are drawings for explaining in detail an operation of an STA which has received a TIM.

Referring to FIG. 7, in order to receive a beacon frame including a TIM from an AP, an STA may switch from a sleep state to an awake state, and may interpret a received TIM element to know that there is buffered traffic to be transmitted to the STA. After contending with other STAs to access a medium for PS-poll frame transmission, the STA may transmit a PS-poll frame to request the AP to transmit a data frame. The AP which has received the PS-poll frame transmitted by the STA may transmit the frame to the STA. The STA may receive a data frame and transmit an ACK frame for this to the AP. Thereafter, the STA may switch back to the sleep state.

As shown in FIG. 7, the AP may operate in an immediate response manner in which a data frame is transmitted after a specific time (e.g., short inter-frame space (SIFS)) from reception of a PS-poll frame from the STA. Meanwhile, if the AP fails to prepare a data frame to be transmitted to the STA during the SIFS time after reception of the PS-poll frame, the AP may operate in a deferred response manner, which will be described with reference to FIG. 8.

In the example of FIG. 8, an operation in which the STA switches from the sleep state to the awake state to receive a TIM from the AP and transmit a PS-poll frame to the AP through contention is the same as the example of FIG. 7. If the AP fails to prepare the data frame during the SIFS even if the PS-poll frame is received, an ACK frame may be transmitted to the STA instead of transmitting a data frame. When the data frame is prepared after transmitting the ACK frame, the AP may transmit a data frame to the STA after performing contending. The STA may transmit the ACK frame to the AP to indicate that the data frame is successfully received, and then may switch to the sleep state.

FIG. 9 shows an example in which an AP transmits a DTIM. STAs may switch from a sleep state to an awake state to receive a beacon frame including a DTIM element from the AP. Through the received DTIM, the STAs may know that a multicast/broadcast frame will be transmitted. The AP may transmit data (i.e., multicast/broadcast frame) directly without an operation of transmitting/receiving a PS-poll frame after transmitting the beacon frame including the DTIM. The STAs may receive data while maintaining the awake state persistently after reception of the beacon frame including the DTIM, and may switch back to the sleep state after data reception is complete.

General Frame Structure

Figure 10:
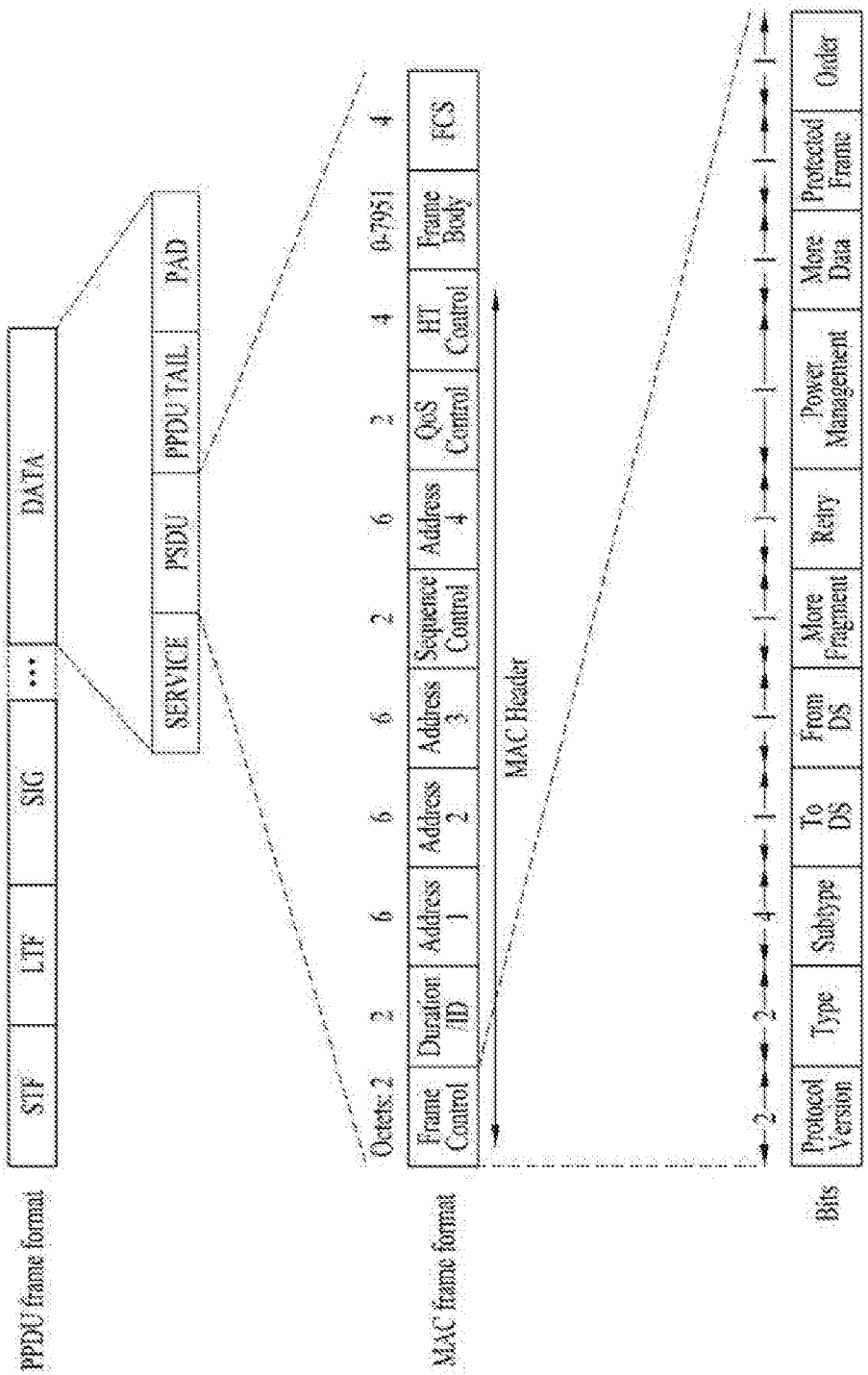
FIG. 10 illustrates an example of a frame structure used in an IEEE 802.11 system.

FIG. 10 illustrates an example of a frame structure used in an IEEE 802.11 system.

A physical layer protocol data unit (PPDU) frame format may include a short training field (STF), a long training field (LTF), a signal (SIG) field, and a data field. The most basic (e.g., non-high throughput (HT)) PPDU frame format may include only a legacy-STF (L-STF), a legacy-LTF (L-LTF), an SIG field, and a data field.

The STF is a signal for signal detection, automatic gain control (AGC), diversity selection, precise time synchronization, or the like, and the LTF is a signal for channel estimation, frequency error estimation, or the like. The STF and the LTF may be collectively referred to as a PLCP preamble, and the PLCP preamble may be a signal for channel estimation and synchronization of an OFDM physical layer.

The SIG field may include a rate field and a length field or the like. The rate field may include information on a data modulation and coding rate. The length field may include information on a data length. In addition, the SIG field may include a parity bit, an SIG tail bit, or the like.

The data field may include a service field, a physical layer service data unit (PSDU), and a PPDU tail bit, and optionally may include a padding bit. Some bits of the service field may be used for synchronization of a descrambler at a receiving end. The PSDU may include data generated/used in a higher layer, in association with a MAC protocol data unit (MPDU) defined in a MAC layer. The PPDU tail bit may be used to return an encoder to a zero state. The padding bit may be used to adjust a length of the data field to a specific unit.

The MPDU is defined according to various MAC frame formats, and a basic MAC frame consists of a MAC header, a frame body, and a frame check sequence (FCS). The MAC frame may be constructed of an MPDU and may be transmitted/received through a PSDU of a data part of a PPDU frame format.

The MAC header includes a frame control field, a duration/ID field, an address field, or the like. The frame control field may include control information required for frame transmission/reception. The duration/ID field may be set to a time for transmitting a corresponding frame or the like.

The duration/ID field included in the MAC header may be set to a 16-bit length (e.g., B0~B15). Content included in the duration/ID field may vary depending on a frame type and a sub type, whether it is transmitted during a contention free period (CFP), QoS capability of a transmitting STA, or the like. In a control frame of which a sub type is PS-poll, the duration/ID field may include an AID of a transmitting STA (e.g., through 14 LSB bits), and 2 MSB bits may be set to 1. (ii) In frames transmitted during a CFP by a point coordinator (PC) or a non-QoS STA, the duration/ID field may be set to a fixed value (e.g., 32768). (iii) In addition thereto, in other frames transmitted by the non-QoS STA or control frames transmitted by the QoS STA, the duration/ID field may include a duration value defined for each frame type. In a data frame or management frame transmitted by the QoS STA, the duration/ID field may include a duration value defined for each frame type. For example, if the duration/ID field is set to B15=0, it indicates that the duration/ID field is used to indicate a TXOP duration, and B0~B14 may be used to indicate an actual TXOP duration. The actual TXOP duration indicated by the B0~B14 may be any one of 0~32767, and a unit thereof may be a microsecond (us). However, if the duration/ID field indicates a fixed TXOP duration value (e.g., 32768), it may be set to B15=1 and B0~B14=0. In addition thereto, if it is set to B14=1 and B15=1, the duration/ID field is used to indicate an AID, and B0~B13 indicate one AID in the range of 1~2007. Details of Sequence Control, QoS Control, and HT Control subfields of a MAC header may refer to the IEEE 802.11 standard document.

A frame control field of the MAC header may include Protocol Version, Type, Subtype, To DS, From DS, More Fragment, Retry, Power Management, More Data, Protected Frame, and Order subfields. Details of each subfield of the frame control field may refer to the IEEE 802.11 standard document.

OFDM Packet Classification for IEEE 802.11a/n/ac/ax

Figure 11:
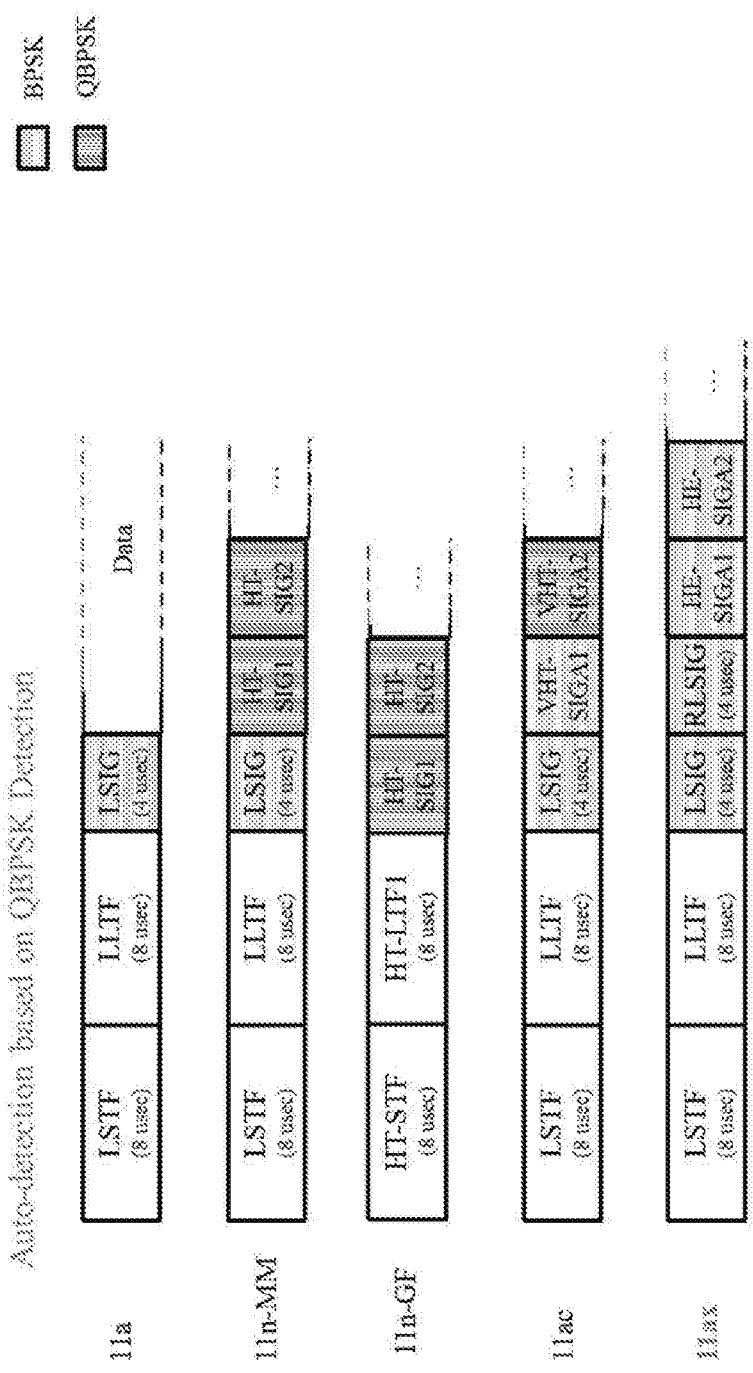
FIG. 11 illustrates OFDM packet classification in an IEEE802.11 system.

Packet classification for IEEE 802.11a/n/ac/ax is briefly described with reference to FIG. 11. A legacy corresponds to 11a.

An L-SIG field of an 11a PPDU includes a binary phase shift keying (BPSK) symbol.

Figure 12:
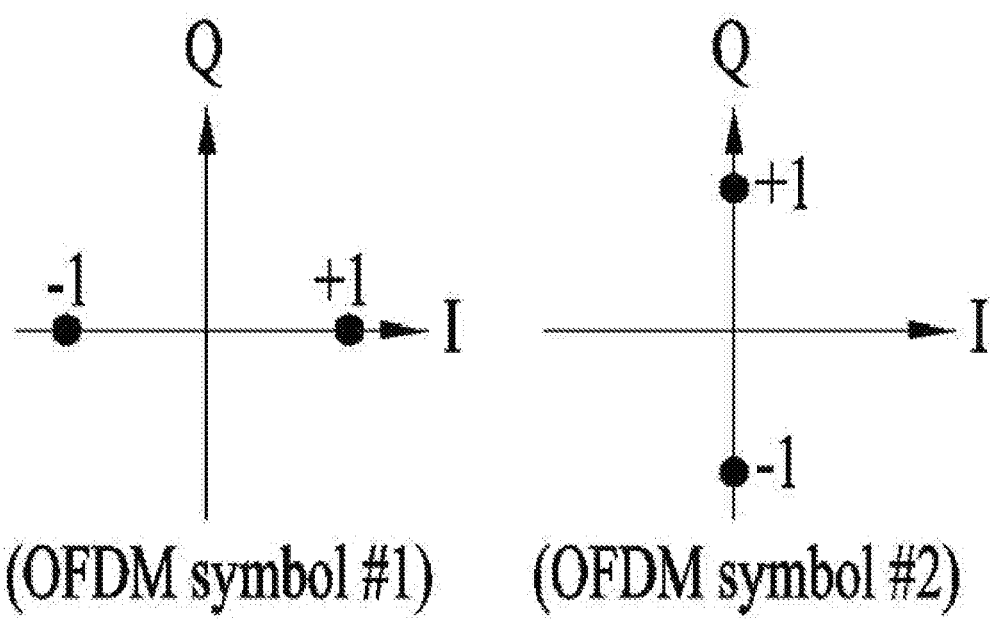
FIG. 12 illustrates a BPSK-modulated symbol and a QBPSK-modulated symbol.

In 11n, PPDUs may be classified into an 11n-mixed mode (MM) format and an 11n-green field (GF) format. The 11n-MM format includes an L-STF, an L-LTF, and an L-SIG field, which correspond to the legacy, and includes HT-SIG 1 and HT-SIG 2 fields corresponding to 11n. The L-SIG field includes a BPSK symbol, and each of the HT-SIG 1 and HT-SIG 2 fields includes a quadrature binary phase shift keying (QBPSK) symbol. A QBPSK corresponds to a BPSK rotated by 90 degrees. Referring to BPSK and QBPSK symbols illustrated in FIG. 12, OFDM symbol #1 in FIG. 12 corresponds to a BPSK symbol (i.e., a symbol modulated through a BPSK constellation), and OFDM symbol #2 is a QBPSK symbol (i.e., a symbol modulated through QPSK constellation). The 11n-GF format includes an HT-STF, an HT-LTF1, an HT-SIG 1 field, and an HT-SIG 2 field, and each of the HT-SIG 1 and HT-SIG 2 fields includes a QBPSK symbol.

An 11ac PPDU includes an L-STF, an L-LTF, and an L-SIG field, which correspond to the legacy, and includes VHT-SIG 1 and VHT-SIG 2 fields corresponding to 11ac. The L-SIG field includes a BPSK symbol, the VHT-SIG 1 field includes a BPSK symbol, and the V HT-SIG 2 field includes a QBPSK symbol.

An 11ax PPDU includes an L-STF, an L-LTF, and an L-SIG field, which corresponding to the legacy, and may additionally include an RL-SIG field, which is a repetition of the L-SIG field. The L-SIG and RL-SIG fields include a BPSK symbol. In addition, the 11ax PPDU may include an HE-SIG 1 field and/or an HE-SIG 2 field corresponding to 11ax. The HE-SIG 1 and HE-SIG 2 fields may include a BPSK symbol.

Wake-Up Radio (WUR)

First, a wake-up radio receiver (WURx) compatible with a WLAN (e.g., 802.11) will be described in general with reference to FIG. 13.

Figure 13:
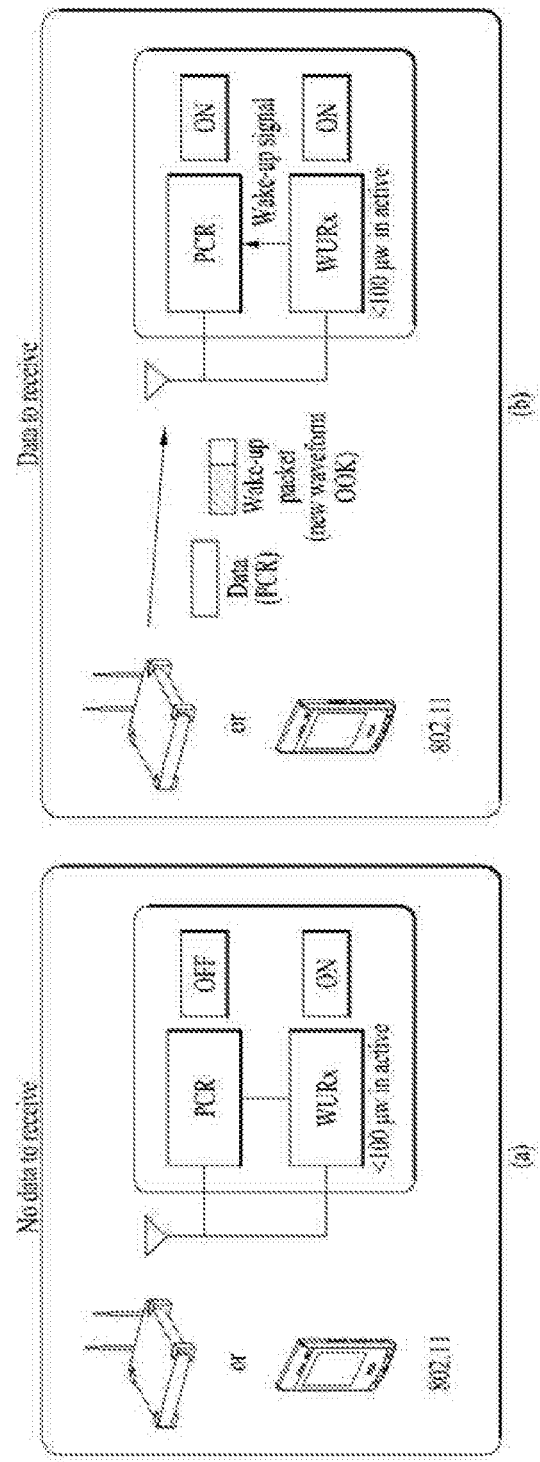
FIG. 13 illustrates a WUR receiver available for a WLAN system (e.g., 802.11).

Referring to FIG. 13, a STA may support a primary connectivity radio (PCR, e.g., IEEE 802.11a/b/g/n/ac/ax WLAN) for main wireless communication and a wake-up radio (WUR, e.g., IEEE 802.11ba).

The PCR may be used for data transmission and reception and may be turned off when there is no data to transmit or receive. When there is a packet to receive with the PCR turned off, a WURx of the STA may wake up the PCR. Accordingly, user data is transmitted and received through the PCR.

The WURx may not be used for user data but may function only to wake up a PCR transceiver. The WURx may be a simple receiver having no transmitter and is activated while the PCR is turned off. The desired power consumption of the WURx which is activated does preferably not exceed 100 microwatt (uW). For the WURx to operate with low power, a simple modulation scheme, for example, on-off keying (OOK), may be used, and a narrow bandwidth (e.g., 4 MHz or 5 MHz) may be used. The desired reception range (e.g., distance) of the WURx may currently correspond to that in 802.11.

Figure 14:
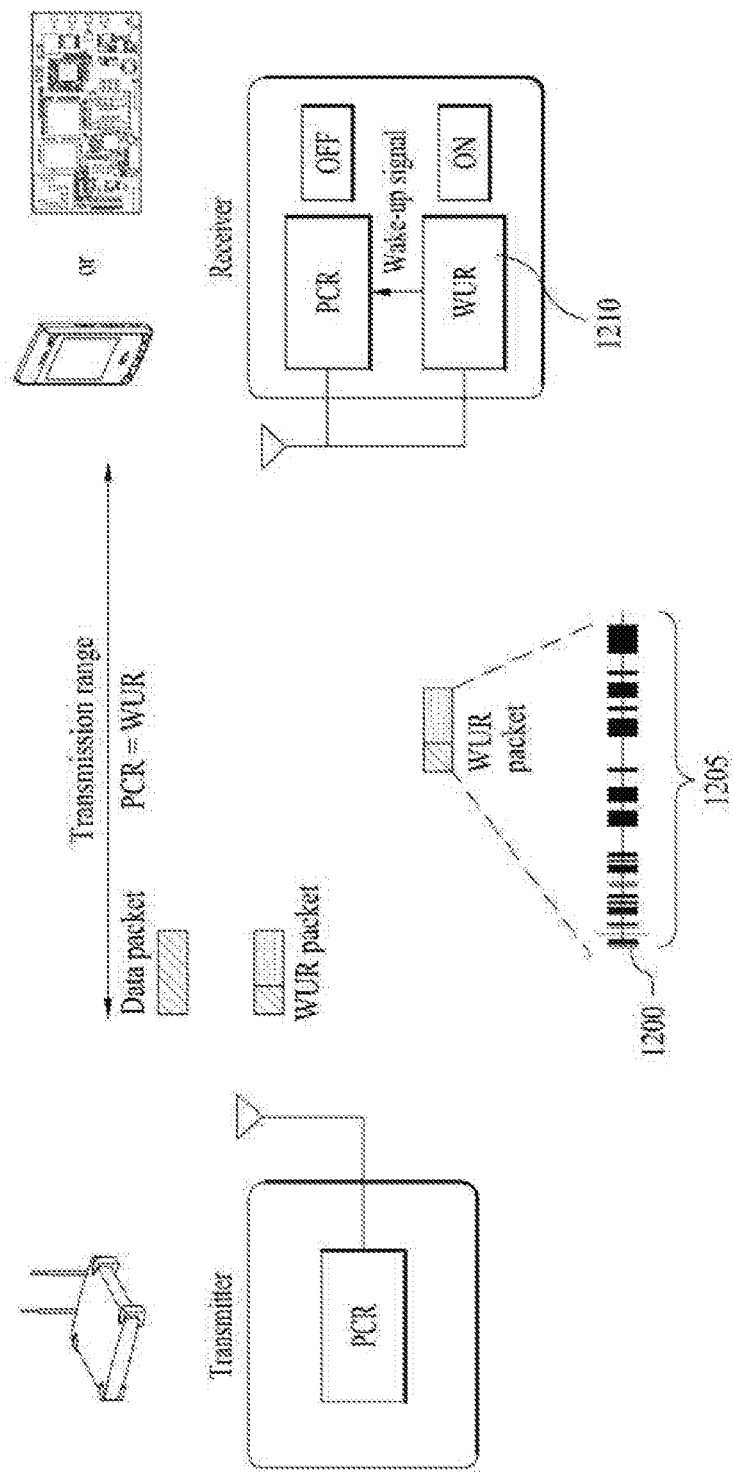
FIG. 14 illustrates the operation of a WUR receiver.

FIG. 14 illustrates the design and operation of a WUR packet.

Referring to FIG. 14, a WUR packet may include a PCR part 1200 and a WUR part 1205.

The PCR part 1200 is for coexistence with a legacy WLAN system and may also be referred to as a WLAN preamble. To protect the WUR packet from another PCR STA, at least one of an L-STF, an L-LTF, and an L-SIG for a legacy WLAN may be included in the PCR part 1200. Thus, a third-party legacy STA may identify through the PCR part 1200 of the WUR packet that the WUR packet is not intended for the third-party legacy STA and a PCR medium is occupied by another STA. Here, a WURx does not decode the PCR part of the WUR packet, because the WURx supporting narrowband and OOK demodulation does not support receiving a PCR signal.

At least part of the WUR part 1205 may be modulated by OOK. For example, the WUR part may include at least one of a WUR preamble, an MAC header (e.g., a receiver address), a frame body, and a frame check sequence (FCS). OOK modulation may also be performed by modifying an OFDM transmitter.

As described above, the WURx 1210 consumes a very small power of 100 uW or less and may be configured as a small and simple OOK demodulator.

Since the WUR packet needs designing to be compatible in a WLAN system, the WUR packet may include a legacy WLAN preamble (e.g., an OFDM scheme) and a new LP-WUR packet waveform (e.g., OOK modulation).

Figure 15:
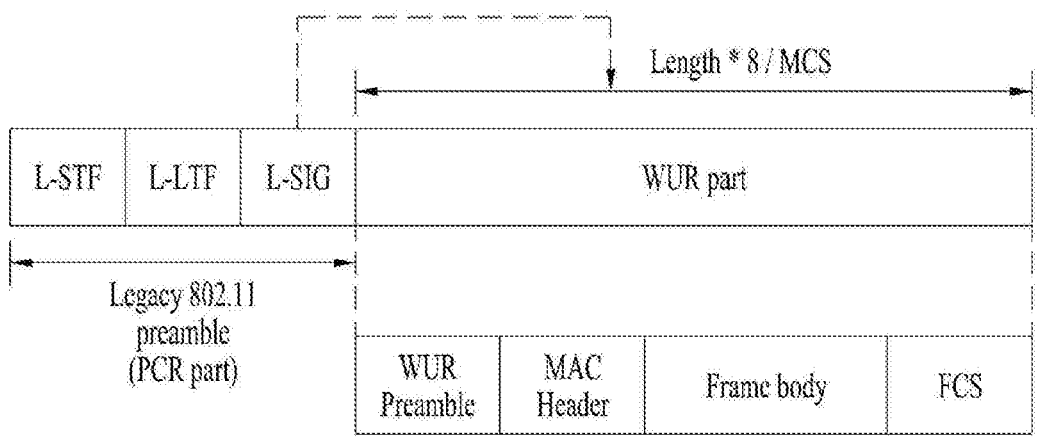
FIG. 15 illustrates an example of a WUR packet.

FIG. 15 illustrates an example of a WUR packet. The WUR packet illustrated in FIG. 15 includes a PCR part (e.g., a legacy WLAN preamble) for coexistence with a legacy STA.

Referring to FIG. 15, the legacy WLAN preamble may include an L-STF, an L-LTF, and an L-SIG. A WLAN STA (e.g., a third party) may detect the start of the WUR packet through the L-STF. Further, the WLAN STA (e.g., a third party) may identify the end of the WUR packet through the L-SIG. For example, the L-SIG field may indicate the length of a payload (e.g., OOK-modulated) of the WUR packet.

The WUR part may include at least one of a WUR preamble, an MAC header, a frame body, and an FCS. The WUR preamble may include, for example, a PN sequence. The MAC header may receive a receiver address. The frame body may include other information necessary for wake-up. The FCS may include a cyclic redundancy check (CRC).

Figure 16:
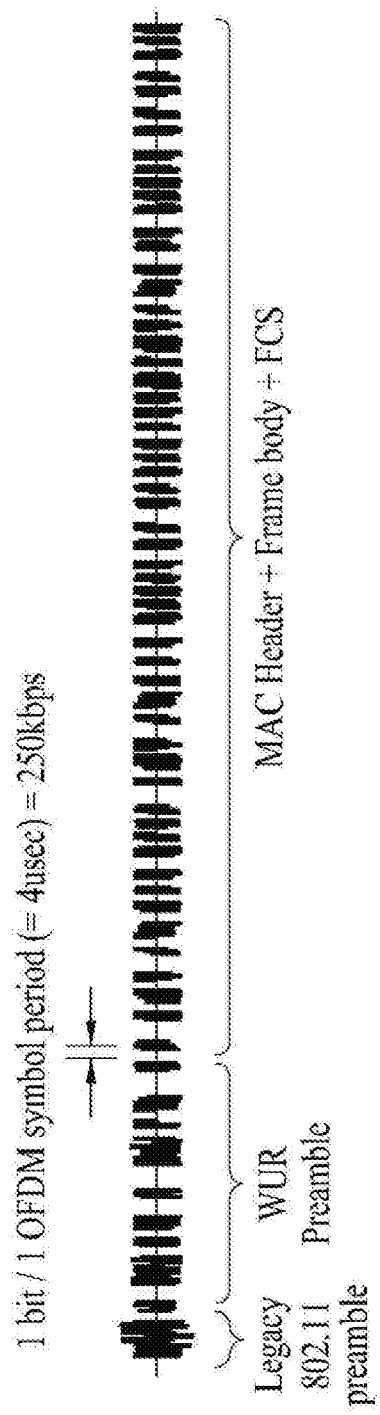
FIG. 16 illustrates the waveform of a WUR packet.

FIG. 16 illustrates the waveform of the WUR packet illustrated in FIG. 15. Referring to FIG. 16, the OOK-modulated WUR part may transmit one bit for the length of one OFDM symbol (e.g., 4 usec). Therefore, the data rate of the WUR part may be 250 Kbps.

Figure 17:
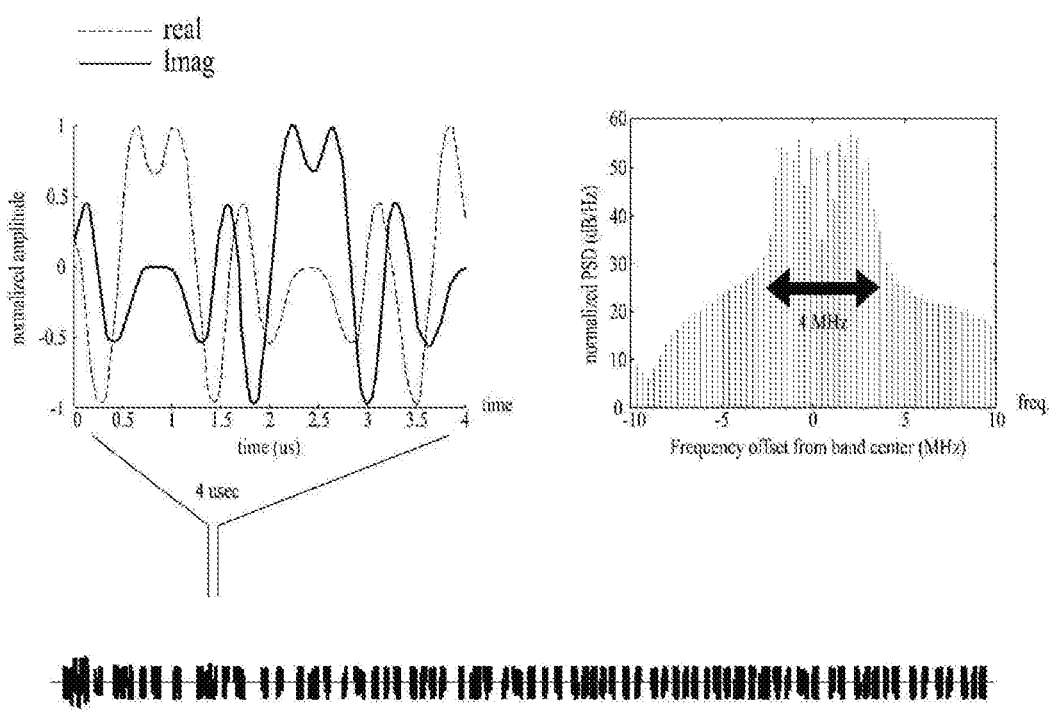
FIG. 17 illustrates a WUR packet generated using an OFDM transmitter of a WLAN.

FIG. 17 illustrates a WUR packet generated using an OFDM transmitter of a WLAN. A phase-shift keying (PSK)-OFDM transmission scheme is used in the WLAN, in which case generating a WUR packet by adding an OOK modulator for OOK modulation may cause an increase in costs for configuring a transmitter. Thus, a method of generating an OOK-modulated WUR packet reusing an OFDM transmitter is illustrated.

According to an OOK modulation scheme, a bit value of 1 is modulated into a symbol having a power of a threshold value or higher (i.e., an on-symbol), and a bit value of 0 is modulated into a symbol having a power of less than the threshold value (i.e., an off-symbol). On the contrary, it is also possible to define a bit value of 1 as power-off.

In the OOK modulation scheme, a bit value of I/O is indicated through power-on/off at the position of a symbol. This simple OOK modulation/demodulation scheme can reduce power consumed for signal detection/demodulation of a receiver and can reduce costs for implementing signal detection/demodulation. Further, OOK modulation of turning on/off a signal may also be performed reusing an existing OFDM transmitter.

A left graph in FIG. 17 illustrates a real part and an imaginary part of the normalized amplitude of a bit value of 1, which is OOK-modulated reusing the existing OFDM transmitter of the WLAN, during a one-symbol interval (e.g., 4 usec). The result of OOK modulation of a bit value of 0 corresponds to power-off and thus is not shown.

A right graph of FIG. 17 illustrates the normalized power spectral density (PSD) of a bit value of 1, which is OOK-modulated reusing the existing OFDM transmitter of the WLAN, in a frequency domain. For example, central 4 MHz in a band may be used for a WUR. Although FIG. 17 shows that the WUR operates at a 4 MHz bandwidth, which is for convenience of description, a different frequency band may be used. Here, it is preferable that the WUR operates at a bandwidth smaller than the operating bandwidth of a PCR (e.g., an existing WLAN) in consideration of power saving.

In FIG. 17, it is assumed that subcarrier spacing is 312.5 kHz, and the bandwidth of an OOK pulse corresponds to 13 subcarriers. As mentioned above, 13 subcarriers correspond to about 4 MHz (i.e., 4.06 MHz=13*312.5 kHz).

Defining an input sequence of inverse fast Fourier transform (IFFT) as s={13 subcarrier tone sequence}, the existing OFDM transmitter performs IFFT on the sequence s by Xt=IFFT(s) and attaches a cyclic prefix (CP) with a 0.8 sec length to the sequence, thereby obtaining a symbol having a length of about 4 us.

A WUR packet may also be referred to as a WUR packet, a WUR frame, or a WUR PPDU. A WUR packet may be a packet for broadcast/multicast (e.g., a WUR beacon) or a packet for unicast (e.g., a packet to terminate a WUR mode of a particular WUR STA and to wake up the WUR STA).

Figure 18:
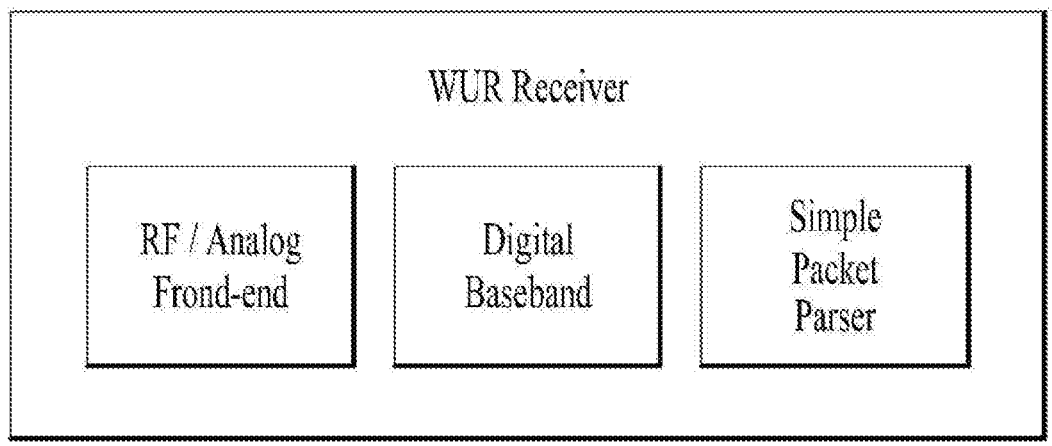
FIG. 18 illustrates the structure of a WUR receiver.

FIG. 18 illustrates the structure of a WUR receiver (WURx). Referring to FIG. 18, the WURs may include an RF/analog front end, a digital baseband processor, a simple packet parser. FIG. 16 shows an illustrative configuration, and a WURx according to the present specification is not limited to FIG. 18.

Hereinafter, a WLAN STA having a WUR receiver is referred to simply as a WUR STA. The WUR STA may be referred to simply as a STA.

OOK Modulation with Manchester Coding

According to an embodiment of the present specification, Manchester coding may be used to generate an OOK symbol. According to Manchester coding, one-bit information is indicated by two pieces of sub-information (or two coded bits). For example, when one-bit information '0' is subjected to Manchester coding, two sub-information bits '10' (i.e., on-off) are output. On the contrary, when one-bit information '1' is subjected to Manchester coding, two sub-information bits '01' (i.e., off-on) are output. However, the on-off order of sub-information bits may be reversed according to an embodiment.

A method for generating one OOK symbol on the basis of the Manchester coding scheme is described. For convenience of description, one OOK symbol is defined to correspond to 3.2 us in the time domain and to correspond to K subcarriers in the frequency domain, but the present specification is not limited thereto.

First, a method for generating one OOK symbol for one-bit information '0' on the basis of Manchester coding is illustrated. The length of one OOK symbol is divided into (i) 1.6 us for a first sub-information bit '1' and (ii) 1.6 us for a second sub-information bit '0'.

(i) A signal corresponding to the first sub-information bit '1' may be obtained by mapping $\beta$ to odd-numbered subcarriers among the K subcarriers, mapping 0 to even-numbered subcarriers, and then performing IFFT. For example, when IFFT is performed by mapping $\beta$ at two-subcarrier intervals in the frequency domain, a periodic signal of 1.6 us repeatedly occurs twice in the time domain. A first or second signal of the 1.6-us periodic signal repeated twice may be used as the signal corresponding to the first sub-information bit '1'. $\beta$ is a power normalization factor, which may be, for example, 1/sqrt (ceil(K/2)). The K consecutive subcarriers used to generate the signal corresponding to the first sub-information bit '1' among a total of 64 subcarriers (i.e., a 20-MHz band) may be represented, for example, by [33-floor(K/2):33+ceil(K/2)−1].

(ii) A signal corresponding to the second sub-information bit '0' may be obtained by mapping 0 to the K subcarriers and performing IFFT. The K consecutive subcarriers used to generate the signal corresponding to the second sub-information bit '0' among a total of 64 subcarriers (i.e., a 20-MHz band) may be represented, for example, by [33-floor (K/2): 33+ceil (K/2)−1].

An OOK symbol for one-bit information '1' may be obtained by disposing the signal corresponding to the sub-information bit '1' after the signal corresponding to the sub-information bit '0'.

Symbol Reduction

For example, the length of one WUR symbol may be set to be shorter than 3.2 us. For example, one symbol may be set to information of 1.6 us, 0.8 us or 0.4 us+CP.

(i) 0.8 us, information bit 1: Among K consecutive subcarriers, subcarriers (i.e., 1, 5, 9, . . . ) satisfying mod(subcarrier index, 4)=1 may be mapped to $\beta$ (e.g., power normalization factor)*1, and the remaining subcarriers may be nullified (e.g., mapped to 0). $\beta$ may be 1/sqrt(ceil(K/4)). In this manner, $\beta$*1 may be mapped at four-subcarrier intervals. When IFFT is performed by mapping $\beta$*1 at four-subcarrier intervals in the frequency domain, signals having a length of 0.8 us are repeated in the time domain, and one of these signals may be used as a signal corresponding to information bit 1.

(ii) 0.8 us, information bit 0: Time-domain signals may be obtained by mapping 0 to K subcarriers and performing IFFT, among which one signal having a length of 0.8 us may be used.

(iii) 0.4 us, information bit 1: Among K consecutive subcarriers, subcarriers (i.e., 1, 9, 17, . . . ) satisfying mod(subcarrier index, 8)=1 may be mapped to $\beta$ (e.g., power normalization factor)*1, and the remaining subcarriers may be nullified (e.g., mapped to 0). $\beta$ may be 1/sqrt(ceil(K/8)). In this manner, $\beta$*1 may be mapped at eight-subcarrier intervals. When IFFT is performed by mapping $\beta$*1 at eight-subcarrier intervals in the frequency domain, signals having a length of 0.4 us are repeated in the time domain, and one of these signals may be used as a signal corresponding to information bit 1.

(iv) 0.4 us, information bit 0: Time-domain signals may be obtained by mapping 0 to K subcarriers and performing IFFT, among which one signal having a length of 0.4 us may be used.

Packet Classification for WUR PPDU

When a WUR packet is transmitted through a portion of a PCR band, a legacy PCR STA (e.g., a Wi-Fi device according to 11n, 11ac, or 11ax) may mistake the WUR packet as a packet thereof and may decode the WUR packet. For example, since a WUR band corresponds to a portion of a PCR band, not only a WUR receiver but a STA operating in a PCR mode may also receive a WUR PPDU. If the PCR STA falsely detects the WUR PPDU as a PCR PPDU, the PCR STA may recognize the WUR PPDU as a PPDU thereof and may attempt to decode the same. In this case, the PCR STA performs unnecessary decoding, thus wasting power.

To solve this problem, a method for distinguishing between a WUR signal and a PCR signal (e.g., a conventional Wi-Fi packet) is proposed.

FIG. 19 illustrates a WUR PPDU according to an embodiment of the present specification. A WUR signal for waking up a PCR may be transmitted using a frame format illustrated in FIG. 19.

Referring to FIG. 19, a WUR frame may be configured such that an L-part is transmitted prior to a WUR part for coexistence with a legacy PCR. The WUR part may include at least one of a WUR-preamble, a WUR-SIG (signal), and a WUR-body. The WUR-body may include control information other than user data for a WUR STA. User data for a WUR STA may be transmitted through a PCR after the WUR STA wakes up.

A WUR PPDU of the present specification is not limited to that in FIG. 19, and the WUR-SIG may be omitted from the WUR PPDU. For example, when the WUR SIG field is omitted, the WUR PPDU may be configured as follows.

[L-part (L-STF+L-LTF+L-SIG)+WUR part (WUR preamble+WUR body)]

Further, the L-part may also be omitted, and the WUR PPDU may include only the WUR part. In this case, the WUR PPDU may be configured as follows.

[WUR preamble+WUR body] or [WUR preamble+WUR SIG+WUR body]

The L-part is for a third-party STA (e.g., a STA operating in the PCR mode) other than a WUR receiver, and the WUR receiver may not decode the L-part.

The WUR part may be transmitted via a narrow bandwidth (BW) using some of available tones (i.e., subcarriers) in a bandwidth for transmitting the L-part (e.g., a 20-MHz PCR band). For example, the BW for transmitting the WUR part may be one BW of 1, 2, 4, 5, 8, and 10 MHz. For example, when IEEE 802.11a OFDM numerology is used, the numbers of available tones corresponding to 1-, 2-, 4-, 5-, 8-, and 10-MHz BWs are 4, 8, 13, 16, 26, and 32, respectively. The length of a frequency sequence for forming a WUR ON symbol may be equal to the number of available tones. For example, when a WUR band is 4 MHz, the length of the frequency sequence corresponding to the WUR ON symbol may correspond to 13 tones.

In another example, when IEEE 802.11ax numerology is used, the numbers of available tones for 1-, 2-, 4-, 5-, 8-, and 10-MHz BWs are 13, 26, 52, 103, and 128, respectively.

Therefore, assuming that some, for example, 13 tones, of available tones in 20 MHz are used, only the 13 tones may carry the WUR signal, and the remaining tones may not carry a signal.

Assuming that the WUR PPDU having the frame format illustrated in FIG. 19 is received by a legacy PCR STA, the legacy PCR STA may perform packet classification as follows.

First, the PCR STA according to 11n/11ac detects an L-SIG. Since the WUR PPDU includes an L-part that is the same as an L-part of a legacy PCR PPDU, the PCR STA performs auto detection of two OFDM symbols following the L-SIG after detecting the L-SIG. The auto detection may be performed by phase detection (e.g., QBPSK detection). Here, as described above, since a WUR signal located after the L-SIG is transmitted using only some tones in terms of frequency, remaining tones not carrying the WUR signal carry a random signal due to the impact of noise and interference.

Due to the impact of the random signal carried by the remaining tones due to noise and interference, the legacy PCR STA may mistake two WUR symbols as QBPSK symbols when performing the auto detection based on QBPSK. That is, the legacy PCR STA may incorrectly determine that the WUR PPDU is an 11n PPDU.

In order to reduce such a determination error, the following method may be used.

Figure 20:
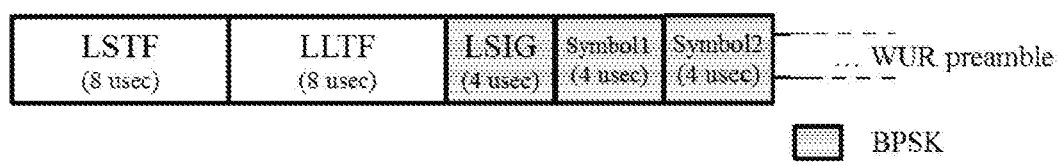
FIG. 20 illustrates a PPDU structure for packet classification according to an embodiment of the present specification.

FIG. 20 illustrates a PPDU structure for packet classification according to an embodiment of the present specification.

Referring to FIG. 20, two OFDM symbols located after an L-SIG field of a WUR PPDU may be used for packet classification, and the two symbols for packet classification may be modulated by BPSK.

The two OFDM symbols for packet classification may be transmitted using the entire PCR band (e.g., 20 MHz) rather than using some tones. For example, the two OFDM symbols for packet classification may be transmitted using 11a numerology.

When the two BPSK symbols for packet classification are transmitted after the L-SIG in the WUR PPDU, the WUR PPDU may be distinguished from a legacy 11n PPDU and may also be prevented from being incorrectly determined as an 11ac PPDU in auto detection.

For example, an 11n STA recognizes a PPDU in which all two symbols following an L-SIG are QBPSK symbols as an 11n PPDU. Thus, by transmitting the two symbols following the L-SIG by BPSK, it is possible to prevent the 11n STA from mistaking the WUR PPDU as an 11n PPDU.

Further, an 11ac STA recognizes a PPDU in which all two symbols following an L-SIG are BPSK and QBPSK symbols as an 11ac PPDU. Thus, by transmitting the two symbols following the L-SIG by BPSK, it is possible to prevent the 11ac STA from mistaking the WUR PPDU as an 11ac PPDU.

An 11ax STA determines an 11ax PPDU through an L-Length field (e.g., by determining whether length mode 3=0) when an L-SIG is detected. Thus, by transmitting two symbols following an L-SIG by BPSK, it is possible to prevent the 11ax STA from mistaking a WUR PPDU as an 11ax PPDU.

The two symbols for packet classification may be configured with dummy symbols, or the L-SIG may be repeated in the two symbols.

In addition, the symbols for packet classification may not be subjected to scrambling.

Although two OFDM symbols following an L-SIG have been described as being used for packet classification, the present specification is not limited thereto. Instead, three or more symbols may be used for packet classification.

The number of symbols for packet classification may be N (N is an integer of 2 or greater), and N symbols may be located after an L-SIG. As described above, N symbols may be dummy symbols, may be configured by repeating the L-SIG, or may be configured by repeating at least a portion of an L-part. For example, the N symbols may be configured by repeating an L-LTF included in the L-part.

Figure 21:
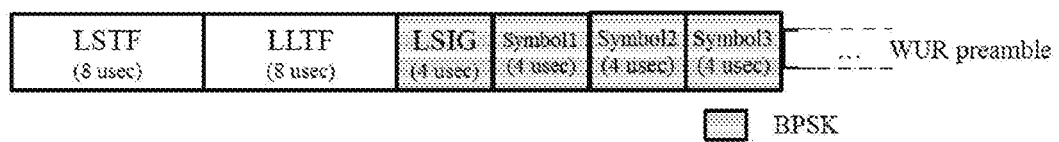
FIG. 21 illustrates a PPDU structure for packet classification according to another embodiment of the present specification.
Figure 21:
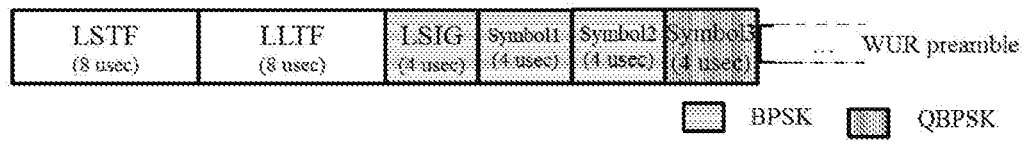

FIG. 21 illustrates a PPDU structure for packet classification according to another embodiment of the present specification.

For example, when three symbols are used for packet classification, the three symbols may be configured as illustrated in FIG. 21.

Similarly to the two symbols, the three symbols may also be configured by repeating an L-SIG and/or an L-LTF, and scrambling for the three symbols may be omitted.

When the three symbols are used, an 11ax STA may also be prevented from incorrectly determining a WUR PPDU as an 11ax PPDU using a length field of the L-SIG.

The foregoing PPDU classification is not limited to a WUR PPDU and may be applied to other new PPDU formats. For example, when a particular PPDU is newly defined, the aforementioned methods may be used to prevent the newly defined PPDU from being mistaken as a legacy PPDU.

Figure 22:
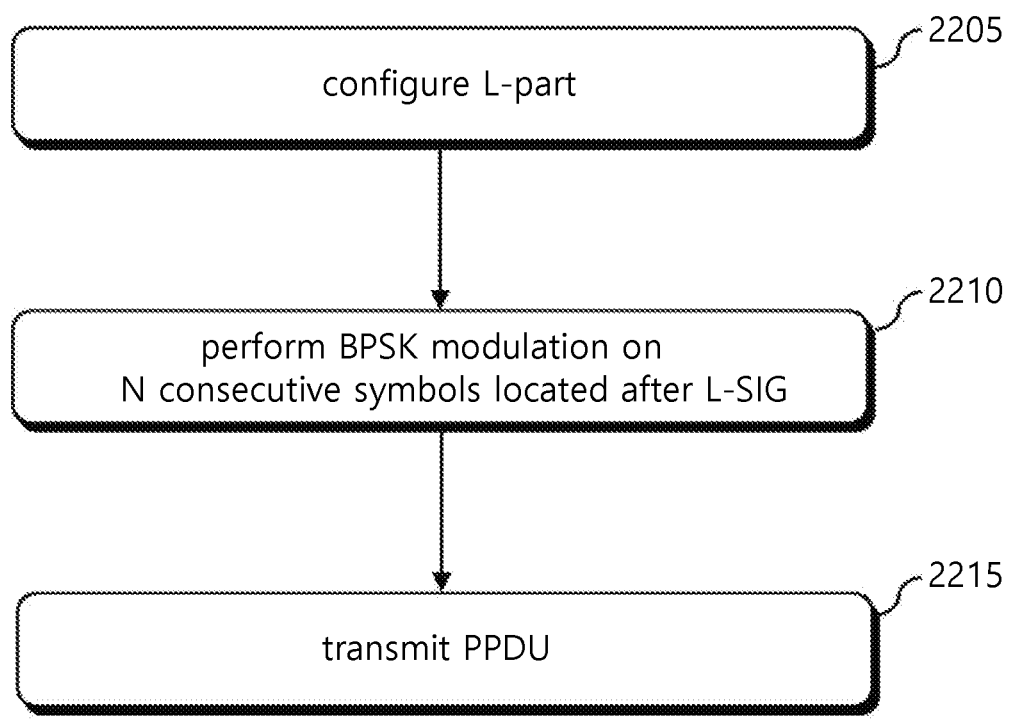
FIG. 22 is a flowchart illustrating a method for transmitting and receiving a PPDU according to an embodiment of the present specification.

FIG. 22 is a flowchart illustrating a method for transmitting and receiving a PPDU according to an embodiment of the present specification.

Referring to FIG. 22, an STA configures an L-part including a legacy-short training field (L-STF), a legacy-long training field (L-LTF), and a legacy-signal field (L-SIG) (2205). The STA may be an access point (AP) STA or a non-AP STA.

When a PPDU to be transmitted by the STA corresponds to/relates to a predetermined format, the STA performs binary phase shift keying (BPSK) modulation on N consecutive symbols located after the L-SIG for packet classification (2210). For example, N may be 2 or 3.

The STA transmits the PPDU including the L-part and the N BPSK-modulated symbols (2215).

For example, the PPDU in the predetermined format may correspond to a wake-up radio (WUR) PPDU. The WUR PPDU may further include a WUR preamble for synchronization. The L-SIG and the N symbols for packet classification included in the WUR PPDU may be transmitted through the entire primary connectivity radio (PCR) band. The WUR preamble may be transmitted through some tones of the PCR band.

The N symbols for packet classification may correspond to dummy symbols or may be a repetition of the L-SIG.

The STA may skip scrambling of the N symbols for packet classification.

Figure 23:
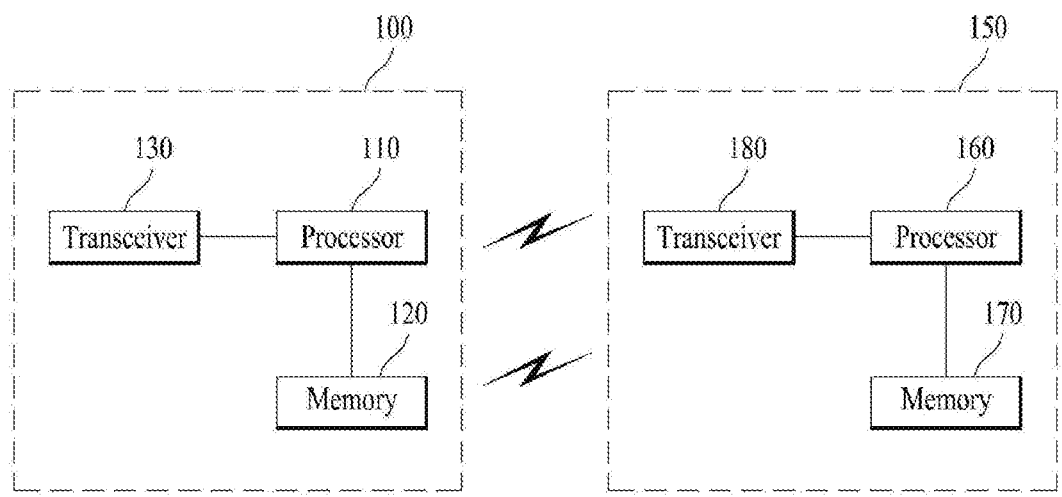
FIG. 23 illustrates a device according to an embodiment of the present specification.

FIG. 23 is a diagram describing a device for implementing the above-described method.

The wireless device 100 of FIG. 23 may correspond to the specific STA of the above description, and the wireless device 150 may correspond to the AP described above.

The STA (100) may include a processor (110), a memory (120), and a transmitting/receiving unit (130), and the AP (150) may include a processor (160), a memory (170), and a transmitting/receiving unit (180). The transceiver (130, 180) transmits/receives a radio signal and may be operated in a physical layer of IEEE 802.11/3GPP, and so on. The processor (110, 160) may be operated in the physical layer and/or MAC layer and may be operatively connected to the transceiver (130, 180). The processors 110 and 160 may perform the UL MU scheduling procedure described above.

The processor (110, 160) and/or the transceiver (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The transceiver 130 of the STA may include a transmitter (not shown) and a receiver (not shown). The receiver of the STA includes a main connected radio (e.g., Wireless LAN) receiver for receiving main connected radio (e.g., IEEE 802.11 a/b/g/n/ac/WUR receiver. The STA's transmitter may include a main connected radio transmitter for transmitting the main connected radio signal.

The transceiver 180 of the AP may include a transmitter (not shown) and a receiver (not shown). The transmitter of the AP may correspond to the OFDM transmitter. The AP may reuse the OFDM transmitter to send the WUR payload to OOK modulation. For example, the AP may OOK modulate the WUR payload via an OFDM transmitter, as described above.

As described above, the detailed description of the preferred exemplary embodiment of the present specification is provided so that anyone skilled in the art can implement and execute the present specification. In the detailed description presented herein, although the present specification is described with reference to the preferred exemplary embodiment of the present specification, it will be understood by anyone having ordinary skills in the art that diverse modifications, alterations, and variations can be made in the present specification. Therefore, the scope and spirit of the present specification will not be limited only to the exemplary embodiments of the present specification set forth herein. Thus, it is intended to provide the broadest scope and spirit of the appended claims of the present specification that are equivalent to the disclosed principles and novel characteristics of the present specification.

INDUSTRIAL APPLICABILITY

The present specification is applicable to various wireless communication systems, including IEEE 802.11.

What is claimed is:

1. A method performed by a station (STA) in a wireless local area network (WLAN) system, the method comprising:
  configuring an L(legacy)-part and two orthogonal frequency division multiplexing (OFDM) symbols,
    wherein the L-part comprises a legacy-short training field (L-STF), a legacy-long training field (L-LTF), and a legacy-signal field (L-SIG),
    wherein the two OFDM symbols are located after the L-SIG and are modulated by binary phase shift keying (BPSK) for packet classification, and
    wherein the two OFDM symbols are a repetition of the L-SIG; and
  transmitting a wake-up radio physical layer protocol data unit (WUR PPDU) comprising the L-part and the two OFDM symbols.

2. The method of claim 1, wherein the WUR PPDU further comprises a WUR preamble for synchronization, the L-SIG and the two OFDM symbols comprised in the WUR PPDU are transmitted through an entire primary connectivity radio (PCR) band, and the WUR preamble is transmitted through some tones of the PCR band.

3. The method of claim 1, wherein the STA skips scrambling of the two OFDM symbols.

4. The method of claim 1, wherein the STA is an access point (AP) STA or a non-AP STA.

5. A station (STA) configured to operate in a wireless local area network (WLAN) system, the STA comprising:
  a processor to configure an L(legacy)-part and two orthogonal frequency division multiplexing (OFDM) symbols,
    wherein the L-part comprises a legacy-short training field (L-STF), a legacy-long training field (L-LTF), and a legacy-signal field (L-SIG),
    wherein the two OFDM symbols are located after the L-SIG and are modulated by binary phase shift keying (BPSK) for packet classification, and
    wherein the two OFDM symbols are a repetition of the L-SIG; and
  a transmitter to transmit a wake-up radio physical layer protocol data unit (WUR PPDU) comprising the L-part and the two OFDM symbols based on control of the processor.

6. The STA of claim 5, wherein the WUR PPDU further comprises a WUR preamble for synchronization, the L-SIG and the two OFDM symbols comprised in the WUR PPDU are transmitted through an entire primary connectivity radio (PCR) band, and the WUR preamble is transmitted through some tones of the PCR band.

7. The STA of claim 5, wherein the processor skips scrambling of the two OFDM symbols.

8. The STA of claim 5, wherein the STA is an access point (AP) STA or a non-AP STA.

\* \* \* \* \*